United States Patent
Dag et al.

(10) Patent No.: US 12,480,259 B2
(45) Date of Patent: Nov. 25, 2025

(54) MULTIPART MOLDS AND THREE-DIMENSIONAL PULP ARTICLES MOLDED THEREFROM

(71) Applicant: PAPACKS SALES GMBH, Cologne (DE)

(72) Inventors: Tahsin Dag, Cologne (DE); Florian Barth, Cologne (DE)

(73) Assignee: PAPACKS SALES GMBH, Cologne (DE)

( * ) Notice: Subject to any disclaimer, the term of this patent is extended or adjusted under 35 U.S.C. 154(b) by 0 days.

(21) Appl. No.: 19/048,195

(22) Filed: Feb. 7, 2025

(65) Prior Publication Data

US 2025/0250746 A1    Aug. 7, 2025

Related U.S. Application Data

(63) Continuation of application No. 18/915,989, filed on Oct. 15, 2024, now Pat. No. 12,241,206, which is a continuation of application No. 18/431,478, filed on Feb. 2, 2024, now Pat. No. 12,146,268.

(51) Int. Cl.
| | | |
|---|---|---|
| *D21J 7/00* | (2006.01) | |
| *D21J 3/10* | (2006.01) | |
| *B33Y 80/00* | (2015.01) | |

(52) U.S. Cl.
CPC . *D21J 7/00* (2013.01); *D21J 3/10* (2013.01); *B33Y 80/00* (2014.12)

(58) Field of Classification Search
CPC ............... D21J 7/00; D21J 3/10; B33Y 80/00
See application file for complete search history.

(56) References Cited

U.S. PATENT DOCUMENTS

| | | | |
|---|---|---|---|
| 7,449,087 B2 | 11/2008 | Odajima et al. | |
| 11,365,518 B2 | 6/2022 | Hardacre et al. | |
| 2015/0308050 A1* | 10/2015 | Corbett .................. | B29B 11/14 162/218 |
| 2016/0145811 A1* | 5/2016 | Socci ....................... | D21J 3/10 162/217 |
| 2022/0388201 A1 | 12/2022 | Knoll et al. | |
| 2023/0302736 A1* | 9/2023 | Briden ..................... | D21J 7/00 |
| 2023/0357992 A1 | 11/2023 | Turner et al. | |
| 2023/0364831 A1 | 11/2023 | Goldberg et al. | |

* cited by examiner

*Primary Examiner* — Abbas Rashid
*Assistant Examiner* — Stephen M Russell
(74) *Attorney, Agent, or Firm* — NEO IP

(57) ABSTRACT

The present invention includes a system of multipart devices for the formation, pressing, and coating of molded pulp fiber articles. The system includes a mold device, a pressing device, and/or a coating device. Each device comprises a screen fastened or otherwise connected to the housing unit. The housing unit is a solid, non-porous housing element, and multiple housing units are configured to be reversibly connected to form a single device. When joined together, the screens of each housing unit form a continuous cavity for the molding, pressing, and coating of the product. The housing unit of a mold device comprises one or more vacuum systems which direct vacuum pressure to the product surface of the mold screen to form a pulp fiber product from a pulp fiber slurry. The pulp product is operable to be dried in the mold device, resulting in the formation of a stable, thin-walled pulp product.

19 Claims, 6 Drawing Sheets

MULTIPART MOLDS AND THREE-DIMENSIONAL PULP ARTICLES MOLDED THEREFROM

CROSS REFERENCES TO RELATED APPLICATIONS

This application is related to and claims priority from the following U.S. patents and patent applications. This application is a continuation of U.S. application Ser. No. 18/915, 989, filed Oct. 15, 2024, which is a continuation of U.S. application Ser. No. 18/431,478, filed Feb. 2, 2024, which is incorporated herein by reference in its entirety.

BACKGROUND OF THE INVENTION

1. Field of the Invention

The present invention relates to multipart molds for the formation of three-dimensional articles, and more specifically to multipart molds which are configured to be affixed to solid housing units which are connected via a connecting element.

2. Description of the Prior Art

It is generally known in the prior art to provide vacuum molds comprising separable components which form a cavity when combined.

Prior art patent documents include the following:

U.S. Pat. No. 7,449,087 for Production mold for formed fiber by inventors Odijima et al., filed Jul. 6, 2004 and issued Nov. 11, 2008, is directed to a method of producing a fiber molded article using a pressing mold, including inserting a first split and a second split into a slurry tank such that a fiber layer is formed on the first split and a fiber layer is formed on the second split, placing the pressing mold, which includes a solid elastic member and an inflatable elastic member configured to be inflated, onto the fiber layer on the first split, joining the first split and the second split such that a fiber molded article is formed from the fiber layer on the first split and the fiber layer on the second split, and dewatering and shaping the fiber molded article by pressing the fiber molded article by the solid elastic pressing member and the inflatable elastic pressing member.

US Patent Pub. No. 2023/0357992 for A System and Method for Forming a Moulded Article by inventors Turner et al., filed Apr. 4, 2023 and published Nov. 9, 2023, is directed to a system and method of producing a molded article, e.g. a one-piece container, comprising delivering a fiber suspension to a porous mold and removing a suspending liquid (e.g. water) via pores of the porous mold. An inflatable bladder is inserted into the mold in a collapsed state and then inflated to apply pressure to internal walls of the article to remove water content. A wet embryonic form of the container is then transferred to a non-porous mold where an inflatable bladder applies internal pressure to compress the walls and remove further water content. The container is further dried by microwave and/or air drying and may be coated with a protective layer.

U.S. Pat. No. 11,365,518 for Moulding of articles by inventors Hardacre et al., filed Jan. 25, 2019 and issued Jun. 21, 2022, is directed to method of forming a molded article, including preparing a fiber suspension by liquidizing fibrous material in a suspending liquid using at least one high shear mixer. The fiber suspension is fed to the molding surface of a porous mold. The suspending liquid is removed via the pores of the porous mold to deposit suspended fibers on the mold surface as a molded article. Removing the suspending liquid is achieved by pressing a bladder formed of a flexible impermeable membrane against the article using pressure applied behind the membrane. The molded article is removed from the porous mold dried using microwave radiation generated using at least one magnetron. A molding apparatus is used in the method and a molded article is produced by the method.

US Patent Pub. No. 2023/0364831 for Porous mold for molded fiber part manufacturing and method for additive manufacturing of same by inventors Goldberg et al., filed Mar. 14, 2023 and published Nov. 16, 2023, is directed to systems and methods for creating porous molds using additive manufacturing processes such as three-dimensional (3D) printing. At a high level, it has been found that creating a generally porous mold, or a mold with porous regions or zones, can improve the performance of the mold and the quality of the parts created therefrom. It has further been determined that porous molds can be created using additive manufacturing techniques through manipulation of mold manufacturing parameters such as, but not limited to, layer thickness, number of perimeter layers, fill pattern, and fill density. Through variation of these manufacturing parameters, the porosity of a mold created by an additive manufacturing device, e.g., a 3D printer, can be tailored for use with molded fiber.

SUMMARY OF THE INVENTION

The present invention relates to multipart molds for the formation of three-dimensional (3D) articles. The multipart molds are configured to be housed in a solid housing unit and connected to form one or more unitary mold cavities for molding three-dimensional articles.

It is an object of this invention to provide a mold for shaping three-dimensional articles. The multipart mold is useful for vacuum molding, injection molding, thermoforming, and other molding processes. The mold is useful for molding articles from an aqueous pulp slurry, as well as biodegradable thermoplastics and other moldable materials.

In one embodiment, the present invention includes a system for forming three dimensional pulp products from a natural fiber pulp slurry, including a first mold block including a first mold screen fastened to a first vacuum block via a first fastener, a second mold block including a second mold screen fastened to a second vacuum block via a second fastener, and a base block including a base mold screen fastened to a base vacuum block, wherein the first mold block is connected to the second mold block and the base block such that in a first position, the first mold screen, the second mold screen, and the base mold screen form a cavity and in a second position, the first mold screen separates from the second mold screen, wherein the first mold screen and the second mold screen are porous, wherein the first vacuum block is connected to a first vacuum system and the second vacuum block is connected to a second vacuum system, wherein the first vacuum system and the second vacuum system are configured to apply negative pressure to the cavity via the first mold screen and the second mold screen, and wherein the natural fiber pulp slurry includes natural fibers, wherein the natural fiber pulp slurry is introduced into the cavity, wherein the application of negative pressure to the cavity causes the natural fibers of the natural fiber pulp slurry to aggregate on a porous surface of the first mold screen, the second mold screen, and the base mold screen.

In another embodiment, the present invention includes a system for forming three dimensional pulp products from a natural fiber pulp slurry, including a first mold block including a first mold screen fastened to a first vacuum block via a first fastener, a second mold block including a second mold screen fastened to a second vacuum block via a second fastener, and a base block including a base mold screen fastened to a base vacuum block, wherein the first mold screen and the second mold screen are porous, wherein the first vacuum block and the second vacuum block include a solid, occlusive material, wherein the first vacuum block is configured to receive the first mold screen, wherein the first fastener secures the first mold screen to the first vacuum block, wherein the second vacuum block is configured to receive the second mold screen, wherein the second fastener secures the second mold screen to the second vacuum block, wherein the first mold block is connected to the second mold block and the base block such that in a first position, the first mold screen, the second mold screen, and the base mold screen form a unitary cavity and in a second position, the first mold screen separates from the second mold screen, and wherein a frame is configured to enclose the first mold block, the second mold block, and the base block in the first position, such that a movement of the frame actuates a movement of the first mold block, the second mold block, and the base block.

In a third embodiment, the present invention includes a method of producing a three dimensional molded pulp product, including fastening a first mold screen to a first vacuum block to form a first mold block, wherein the first vacuum block is configured to receive the first mold screen, connecting the first mold block to a base mold block, wherein the base mold block includes a base mold screen and a base vacuum block, connecting the first mold block and the base mold block to a second mold block, wherein the second mold block includes a second porous mold screen and a second vacuum block, compressing the first mold against the second mold, wherein the base mold block is compressed against both the first mold block and the second mold block such that a cavity is formed between the first mold screen, the second mold screen, and the base mold screen, connecting a first vacuum system to the first vacuum block, wherein the first vacuum system is configured to deliver negative pressure to the cavity via the first mold screen, and connecting a second vacuum system to the second vacuum block, wherein the second vacuum system is configured to deliver negative pressure to the cavity via the second mold screen.

In yet another embodiment, the present invention includes a method of producing a three dimensional molded pulp product, including fastening a first mold screen to a first vacuum block to form a first mold block, wherein the first vacuum block is configured to receive the first mold screen, connecting the first mold block to a base mold block, wherein the base mold block includes a base mold screen and a base vacuum block, connecting the first mold block and the base mold block to a second mold block, wherein the second mold block includes a second porous mold screen and a second vacuum block, compressing the first mold against the second mold, wherein the base mold block is compressed against both the first mold block and the second mold block such that a cavity is formed between the first mold screen, the second mold screen, and the base mold screen, securing a frame around the first mold block, the second mold block, and the base mold block, wherein the frame is configured to connect the first vacuum block to a first vacuum system, wherein the first vacuum system is configured to deliver negative pressure to the cavity via the first mold screen, wherein the frame is configured to connect the second vacuum block to a second vacuum system, wherein the second vacuum system is configured to deliver negative pressure to the cavity via the second mold screen, submerging, wholly or partially, the first mold block, the second mold block, and/or the base mold block in a natural fiber pulp slurry, wherein the natural fiber pulp slurry includes natural fibers suspended in an aqueous solution, and activating the first vacuum system and/or the second vacuum system, wherein the natural fiber pulp slurry is vacuumed into the cavity, wherein the aqueous solution is vacuumed through the first mold screen, the second mold screen, and the base mold screen, wherein the natural fibers aggregate on a porous surface of the cavity formed by the first mold screen, the second mold screen, and the base mold screen and form the molded pulp product.

These and other aspects of the present invention will become apparent to those skilled in the art after a reading of the following description of the preferred embodiment when considered with the drawings, as they support the claimed invention.

DETAILED DESCRIPTION

Figure 1:
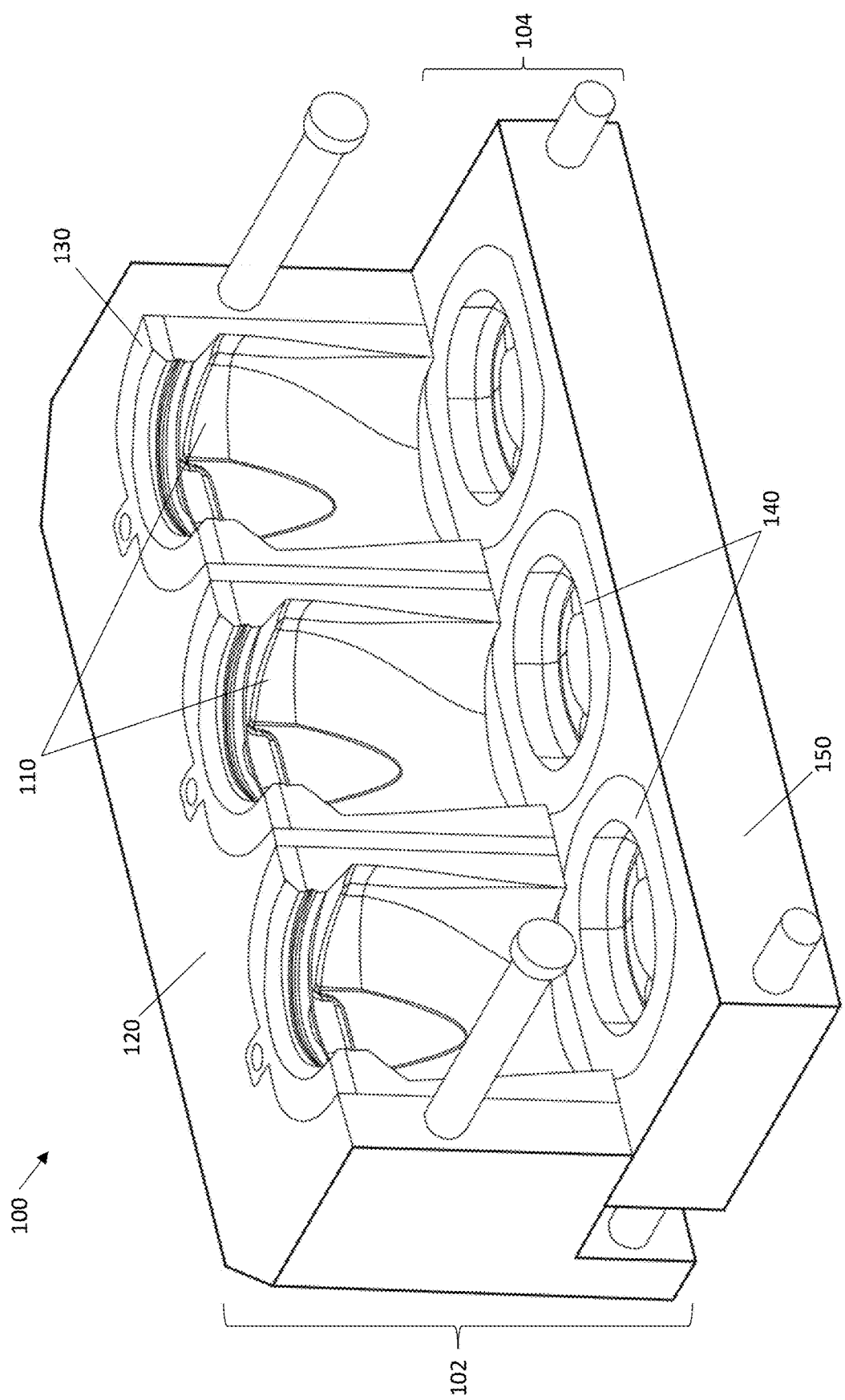
FIG. 1 illustrates a sectional view of a mold device according to one embodiment of the present invention.

The present invention is generally directed to multipart molds for the formation of three-dimensional (3D) articles.

In one embodiment, the present invention includes a system for forming three dimensional pulp products from a natural fiber pulp slurry, including a first mold block including a first mold screen fastened to a first vacuum block via a first fastener, a second mold block including a second mold screen fastened to a second vacuum block via a second fastener, and a base block including a base mold screen fastened to a base vacuum block, wherein the first mold block is connected to the second mold block and the base block such that in a first position, the first mold screen, the second mold screen, and the base mold screen form a cavity and in a second position, the first mold screen separates from the second mold screen, wherein the first mold screen and the second mold screen are porous, wherein the first vacuum block is connected to a first vacuum system and the second vacuum block is connected to a second vacuum system, wherein the first vacuum system and the second vacuum system are configured to apply negative pressure to the cavity via the first mold screen and the second mold screen, and wherein the natural fiber pulp slurry includes natural fibers, wherein the natural fiber pulp slurry is introduced into the cavity, wherein the application of negative pressure to the cavity causes the natural fibers of the natural fiber pulp slurry to aggregate on a porous surface of the first mold screen, the second mold screen, and the base mold screen.

In another embodiment, the present invention includes a system for forming three dimensional pulp products from a natural fiber pulp slurry, including a first mold block including a first mold screen fastened to a first vacuum block via a first fastener, a second mold block including a second mold screen fastened to a second vacuum block via a second fastener, and a base block including a base mold screen fastened to a base vacuum block, wherein the first mold screen and the second mold screen are porous, wherein the first vacuum block and the second vacuum block include a solid, occlusive material, wherein the first vacuum block is configured to receive the first mold screen, wherein the first fastener secures the first mold screen to the first vacuum block, wherein the second vacuum block is configured to receive the second mold screen, wherein the second fastener secures the second mold screen to the second vacuum block, wherein the first mold block is connected to the second mold block and the base block such that in a first position, the first mold screen, the second mold screen, and the base mold screen form a unitary cavity and in a second position, the first mold screen separates from the second mold screen, and wherein a frame is configured to enclose the first mold block, the second mold block, and the base block in the first position, such that a movement of the frame actuates a movement of the first mold block, the second mold block, and the base block.

In a third embodiment, the present invention includes a method of producing a three dimensional molded pulp product, including fastening a first mold screen to a first vacuum block to form a first mold block, wherein the first vacuum block is configured to receive the first mold screen, connecting the first mold block to a base mold block, wherein the base mold block includes a base mold screen and a base vacuum block, connecting the first mold block and the base mold block to a second mold block, wherein the second mold block includes a second porous mold screen and a second vacuum block, compressing the first mold against the second mold, wherein the base mold block is compressed against both the first mold block and the second mold block such that a cavity is formed between the first mold screen, the second mold screen, and the base mold screen, connecting a first vacuum system to the first vacuum block, wherein the first vacuum system is configured to deliver negative pressure to the cavity via the first mold screen, and connecting a second vacuum system to the second vacuum block, wherein the second vacuum system is configured to deliver negative pressure to the cavity via the second mold screen.

In yet another embodiment, the present invention includes a method of producing a three dimensional molded pulp product, including fastening a first mold screen to a first vacuum block to form a first mold block, wherein the first vacuum block is configured to receive the first mold screen, connecting the first mold block to a base mold block, wherein the base mold block includes a base mold screen and a base vacuum block, connecting the first mold block and the base mold block to a second mold block, wherein the second mold block includes a second porous mold screen and a second vacuum block, compressing the first mold against the second mold, wherein the base mold block is compressed against both the first mold block and the second mold block such that a cavity is formed between the first mold screen, the second mold screen, and the base mold screen, securing a frame around the first mold block, the second mold block, and the base mold block, wherein the frame is configured to connect the first vacuum block to a first vacuum system, wherein the first vacuum system is configured to deliver negative pressure to the cavity via the first mold screen, wherein the frame is configured to connect the second vacuum block to a second vacuum system, wherein the second vacuum system is configured to deliver negative pressure to the cavity via the second mold screen, submerging, wholly or partially, the first mold block, the second mold block, and/or the base mold block in a natural fiber pulp slurry, wherein the natural fiber pulp slurry includes natural fibers suspended in an aqueous solution, and activating the first vacuum system and/or the second vacuum system, wherein the natural fiber pulp slurry is vacuumed into the cavity, wherein the aqueous solution is vacuumed through the first mold screen, the second mold screen, and the base mold screen, wherein the natural fibers aggregate on a porous surface of the cavity formed by the first mold screen, the second mold screen, and the base mold screen and form the molded pulp product.

None of the prior art discloses a multipart mold device for both molding and drying thin-walled products which comprises separable housing units (e.g., vacuum blocks) that when combined form a cavity for vacuum molding, pressing, and/or coating three-dimensional pulp products. Further, none of the prior art discloses the use of a base housing unit to form a bottom portion of a three-dimensional pulp product in combination with housing units which form the walls of a three-dimensional pulp product, which are configured to be joined, moved as a whole, and then separated.

Pollution due to the use of non-degradable materials has increased exponentially over the past 100 years. Many of the mass-produced products used to contain and transport food products, beverages, cosmetics, and other materials, as well as sign use products such as utensils and razor handles use plastic or other nonbiodegradable products, are made of non-biodegradable plastics. The development of such plastics, while a groundbreaking discovery in materials engineering, has brought about a growing environmental catastrophe. Because plastics and similar materials are not biodegradable, an excessive number of landfills are needed to just contain this waste. However, landfills do not completely prevent waste from leeching into the soil and polluting the environment. In fact, the collection and high concentration of waste in a specified area exacerbates the environmental hazards. Further, landfills are known to produce carbon dioxide, methane, ammonia, and sulfides. These gases are released into the atmosphere and cause a laundry list of environmental problems, including greenhouse gases, ozone layer destruction, and smog. Landfills, because of their emissions, contribute to the melting of the polar ice caps, and raising the sea level. Rising sea levels result in the erosion of beaches and loss of many marshes and wetlands. Saltwater intrusion into estuaries is also an issue, harming the wildlife that requires these crucial estuaries. Because this nonbiodegradable waste never breaks down, there only exists a growing need for more of these landfills. More landfills mean more of the same problems. This becomes a vicious cycle of a harmful problem requiring an equal if not greater harmful solution.

Not only are landfills a problem, but also much of the waste in the world ends up in our oceans. This pollution kills marine life, destroys ecosystems, and further exacerbates the ongoing climate crisis. Animals affected by plastic pollution suffer from ingestion of plastic, suffocation, and entanglement. Coral in the ocean that encounters plastic waste has increased chances of contracting diseases, thus greatly affecting the surrounding ecosystem. These effects are frequently fatal to wildlife. Aside from the destruction of the ecosystem, marine pollution poses a substantial risk to humans as well. Animals in areas of high marine pollution collect plastics, particularly microplastics, in their body. Microplastics are microscopic plastic particulates which are capable of entering living organisms. The known and growing problem posed by microplastics is that once they are ingested, either by humans or other animals, they are never broken down. When humans consume animal products, such as meat, containing these microplastics, it can lead to long-term health conditions such as cancer and birth defects. Thus, the continued manufacturing and use of plastic products contributes not only to the climate crises, but also negatively impacts global public health. In order to encourage a change, the biodegradable manufacturing industry must be improved, such that biodegradable products can rival traditional, plastic-based products in their function, durability, cost, and ease of manufacturing.

There exist methods of producing environmentally friendly, biodegradable products in an effort to reduce plastic consumption. These methods use fiber pulp to form biodegradable products. One process known in the art involves the use of a vacuum attached to a mesh mold of the desired product. The vacuum is used to create negative pressure, which causes the pulp slurry to conform to the mesh layer according to the desired thickness of the molded fiber product. However, a significant amount of pulp material is used to create the fiber containers of the prior art, which are not configured for both molding and drying in the same mold as in the case of the present invention. Instead, the molded form, after molding, is transferred to a separate mold to dry the product or press the product into the proper shape. Some prior art attempts to use split molds to minimize the stress applied to a molded product after molding but before drying the wet, molded product. However, the split molds of the prior art and screens utilized thereby are not configured to withstand both molding and drying and, optionally, pressing.

Additionally, some prior art attempts to combine plastic ingredients and components with biodegradable materials in order to create reinforced fiber products, such as products for liquids. However, the use of incorporated plastic, such as plastic threaded necks and plastic fiber reinforcement, prevent these products from fully degrading. The present invention provides a method for forming pulp products which are comprised of pulp and do not include any plastics or other non-degradable materials.

Currently there exists an unmet need for fully biodegradable, pulp-based products which are both thin-walled and capable of maintaining integrity (i.e., not degrading) between a molding step and a drying step, as well as during extended exposure to liquid or moisture. Additionally, there exists a need for a method of creating such products. Further, there is an un-met need for a biodegradable, pulp-based product that does not include plastic, bioplastic, or similar non-degradable components or ingredients. Further still, there is an unmet need for a fully biodegradable, pulp-based product which includes a simultaneously formed, biodegradable, threaded neck for attachment of a threaded cap for easy storage, transportation, and consumption of liquid stored within the product. The present invention has provided such a process and a resulting thin-walled product, succeeding where others have failed.

Referring now to the drawings in general, the illustrations are for the purpose of describing one or more preferred embodiments of the invention and are not intended to limit the invention thereto.

Figure 2:
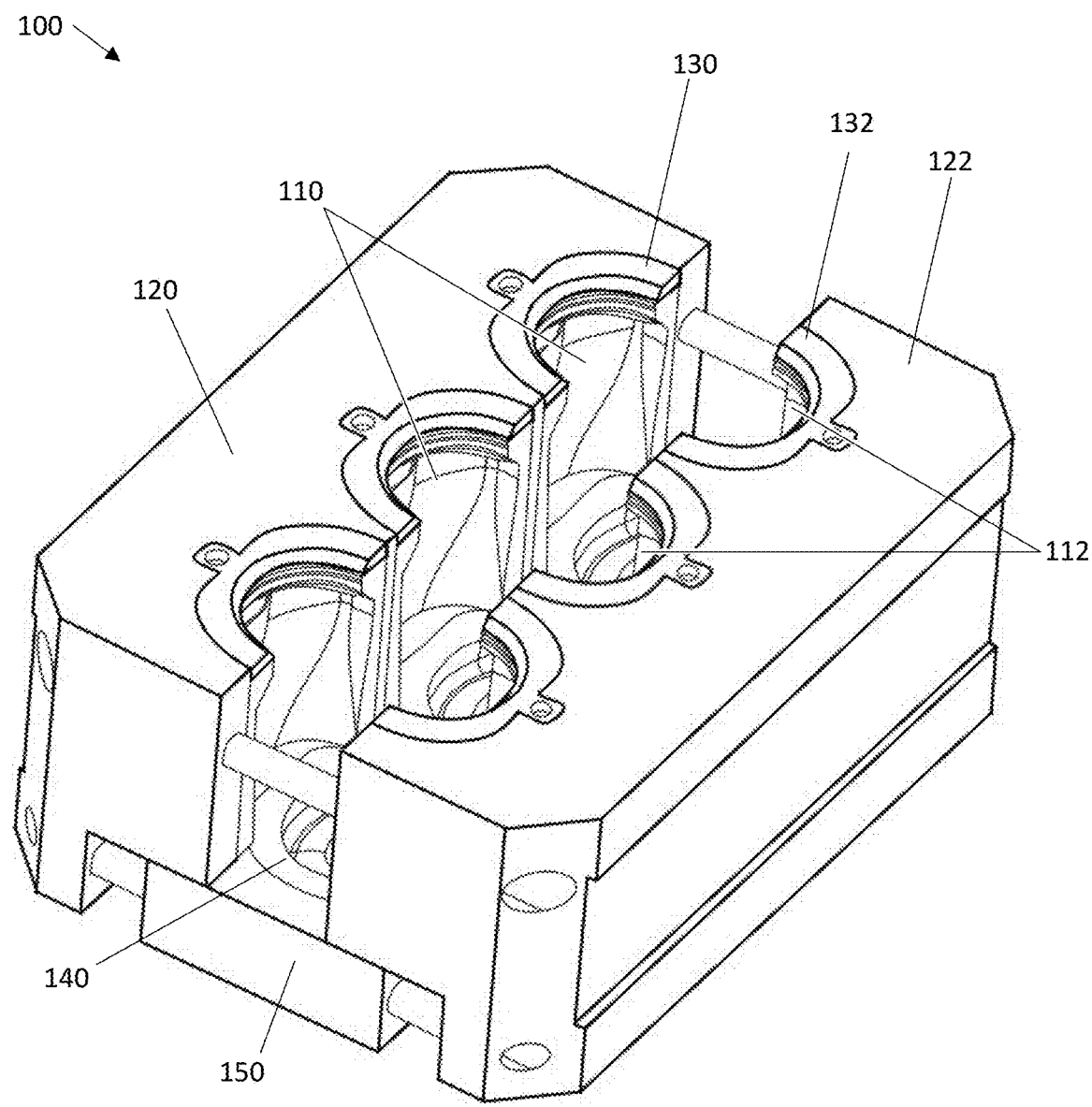
FIG. 2 illustrates an orthogonal view of a mold device according to one embodiment of the present invention.
Figure 3:
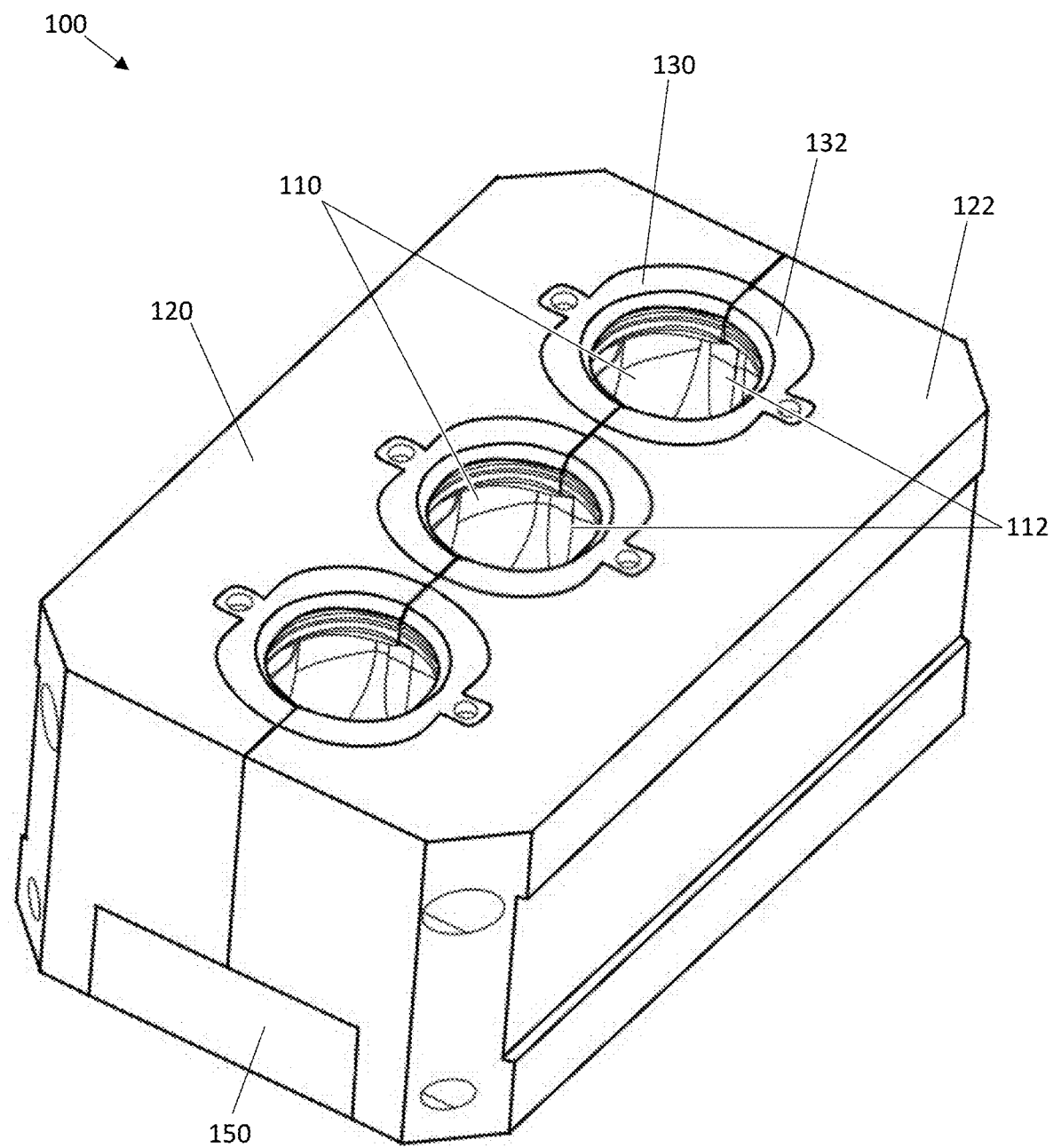
FIG. 3 illustrates an orthogonal view of a mold device according to one embodiment of the present invention.
Figure 4:
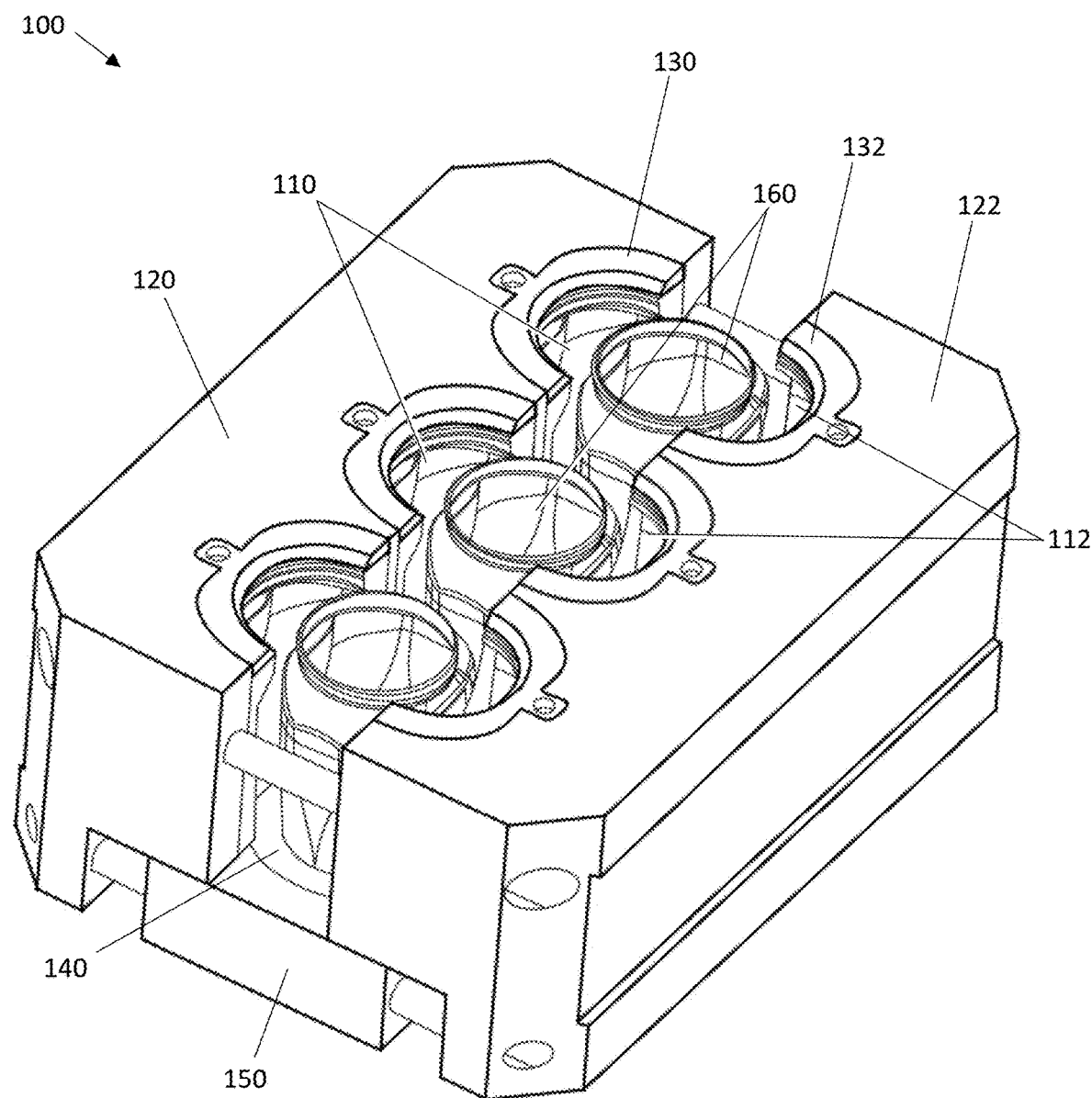
FIG. 4 illustrates an orthogonal view of a mold device according to one embodiment of the present invention.

FIG. 1 illustrates a sectional view of a mold device according to one embodiment of the present invention. The sectional view of the mold device 100 depicts a mold block 102 and a base block 104 according to one embodiment of the present invention. The mold block 102 includes mold screens 110, secured to a housing unit 120 through the use of a fastener rim 130. The base block 104 includes base mold screens 140 affixed to a base housing unit 150. As depicted in FIGS. 2-4, and described herein, the mold block 102 and base block 104 are configured to be affixed to an additional mold block which is a mirror image of the mold block 102 in order to form the complete mold device.

FIGS. 2-4 depict the mold device according to one embodiment of the present invention. Mold screens 110, 112 are fixed to a housing unit 120, 122 and secured by a fastener rim 130, 132. Base mold screens 140 are affixed to a base housing unit 150. FIGS. 2-4 depict the process of closing the mold to form the three-dimensional articles as described herein. FIG. 2 depicts the open mold device, which allows for the placement of the mold screens within the housing unit and the base mold screens within the base housing unit. As depicted in FIG. 3, the complete mold is formed by connecting the two mold blocks and the base block. The article is molded within the complete mold. After molding, the mold device is opened by separating the mold blocks to access the molded articles 160 formed by the mold device 100, as depicted in FIG. 4.

Figure 5:
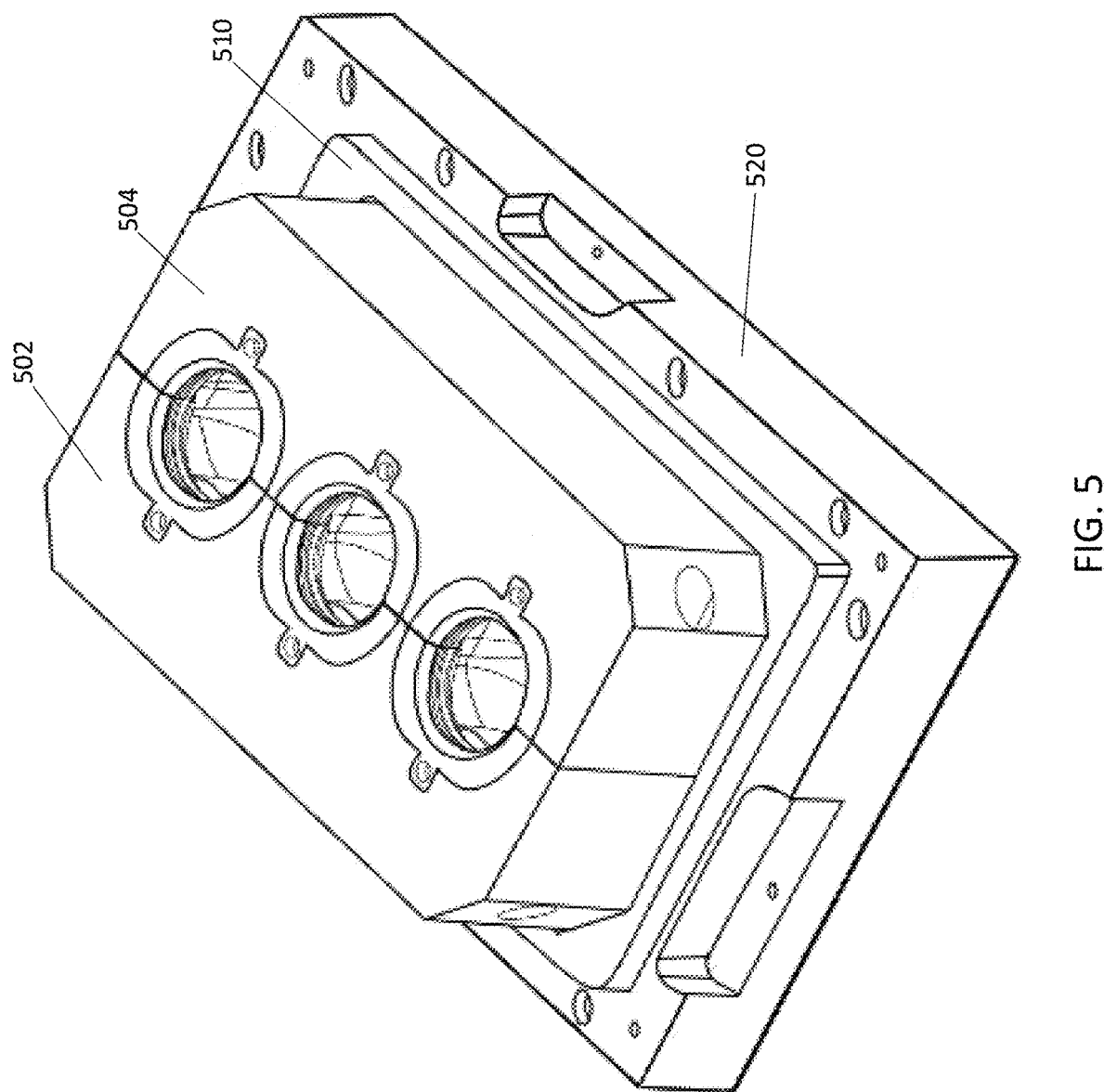
FIG. 5 illustrates an orthogonal view of a tooling component including multiple mold devices according to one embodiment of the present invention.

FIG. 5 illustrates an orthogonal view of a tooling component including multiple mold devices according to one embodiment of the present invention. The mold device 502, 504 are situated within a frame 510. The frame 510 is situated within a tooling base 520 which allows for the movement of the frame 510 and the mold devices 502, 504 simultaneously without disconnecting or disrupting the connection between the mold blocks of each mold device as disclosed herein.

In one embodiment, the system of the present invention incorporates a series of devices configured to mold, press, and coat the molded fiber product, respectively. The first device, a mold device, is submerged in a pulp fiber slurry while vacuum pressure is applied to the product surface of the mold cavity. The product is formed during this step, and optionally dried in the mold device. After formation and optional drying, the product is transferred from the mold device to a pressing device. The pressing device is used to further dewater the molded fiber product and process the surface of the product (e.g., applying a pattern or smoothing the surface after formation and drying). After pressing, the product is transferred to a coating device for coating the product to add additional water resistance, water proofing, or other capabilities imbued by the coating as disclosed herein. In one embodiment, the formed product is operable to be transferred from the mold device to the coating device of the present invention.

In one embodiment, the mold device, the pressing device, and the coating device of the present invention are identical in both size and shape. That is to say, the mold device depicted in FIGS. 1-5 is identical to the pressing device and/or the coating device. Thus, the description applied herein with respect to FIGS. 1-5 is applicable to a description of a pressing device or a coating device according to one embodiment of the present invention. In this way, a machine arm configured to manipulate the mold device is sufficient for the manipulation of the pressing device and the coating device. In one embodiment, one or more devices of the system of the present invention incorporate a groove on a lateral surface of the device. A machine arm is configured to conform to the groove and apply an amount of pressure in order to securely manipulate and/or transport the device.

The screens, including the base screen, of the present invention are comprised of a material that is of a sufficient rigidity to withstand the application of pressure to the screen, either by vacuum force (i.e., negative pressure) or by a parison-like pressing member which applies positive pressure to the product, pressing the product against the screen. Examples of material operable to form the screens of the present invention include but are not limited to metals including aluminum, stainless steel, galvanized steel, pregalvanized steel, plain carbon steel, copper, bronze, brass, titanium, nickel, chromium, and metal alloys comprising any combination thereof. Further, the mold is operable to be formed by an additive manufacturing process (i.e., a three-dimensional printing process), such as fused deposition modeling. Examples of materials operable to form the screens of the present invention via additive deposition include but are not limited to biodegradable thermoplastic polymers such as thermoplastic starch-based plastics (TPS), polyhydroxyalkanoates (PHA), polylactic acid (PLA), polybutylene succinate (PBS), or polycaprolactone (PCL); a biodegradable thermoplastic resin such as biobased polyethylene (PE), biobased polyethylene terephthalate (PET), biobased technical performance polymers (e.g., numerous polyamides (PA), or partially biobased polyurethanes (PUR); natural fiber-based compositions (e.g., NFPC) derived from plants such as hemp, flax, jute, wood, lignocellulosic plant fibers, bamboo, or sweetgrass or any combination thereof; acrylonitrile butadiene styrene (ABS); polylactic acid (PLA); polyethylene terephthalate glycol (PETG); Nylon; thermoplastic polyurethane (TPU); polyvinyl alcohol (PVA); high impact polystyrene (HIPS); carbon fiber; poly-para-phenylene terephthalamide; fiberglass; resin; aluminum; stainless steel; tool steel; titanium; a nickel alloy; or any combination thereof.

In one embodiment, the mold screen and base mold screens of the present invention are operable to be formed using an additive manufacturing process while the pressing screens and coating screens are configured to be formed using an alternative manufacturing process which is not an additive manufacturing process. Further, the screens of the present invention are operable to vary in porosity, composition, and structural characteristics (e.g., tensile strength) depending on the device in which the screen is placed. For example, the screen of the mold device (i.e., the mold screen) is operable to have a higher tensile strength and smaller pores than the press screen of the pressing device. In this way, the system of the present invention is operable to individualize each step of the product formation process, creating a pulp product formation process that is highly specific to the product being formed, including the shape, structural requirements, and fiber composition of the desired product.

One of ordinary skill in the art will appreciate that one or more properties, functions, or disclosures described herein with regards to a first device is operable to apply to other devices. For example, the vacuum system configuration described herein with respect to the mold device is operable to apply to the coating device, such that the coating device is understood to include, in one embodiment, a vacuum system for the application of negative pressure to the coating screens of the coating device. Such disclosures should not be limited only to the device with which they are described herein, as such description has been made for the sake of clarity and brevity and should not be interpreted to limit the device only to those properties, functions, and disclosures. Rather, the properties, functions, or disclosures of the devices of the present invention are applicable to each device.

Molding and Drying

In one embodiment, the system of the present invention uses a mold device for the formation and drying of three-dimensional molded pulp fiber products. The mold device as described herein incorporates multiple mold blocks and a base mold block. Each mold block comprises a porous mold screen affixed to a solid housing unit (i.e., a vacuum block) in order to form the products of the present invention. The porous mold screen comprises a plurality of pores through which moisture is removed during the application of negative pressure via the vacuum system as disclosed herein. The use of a mold device configured to apply negative pressure to the mold screen allows for the vacuum formation of pulp fiber products. The pulp fiber products are subsequentially dried within the mold device in order to stabilize the form before it is transferred to another block device in the system (e.g., a coating device).

The mold blocks and base block of the present invention include mold screens and base mold screens as disclosed herein. As used herein, the term "base mold screen" refers to a mold screen that is affixed to the base housing unit of the present invention. Thus, the disclosure herein relating to mold screens is applicable to the base mold screen, unless explicitly excluded. Further, the disclosure herein relating to the interaction between mold screens and the housing unit to which they are affixed is applicable to the base mold screens and the base housing unit to which they are affixed, unless explicitly excluded. The base mold screen of the present invention is configured to be coupled to the bottom end of the adjacent mold screens, such that negative pressure applied to the base mold screen via the base housing unit is transferred to the mold screens. In this way, negative pressure applied to only the base housing unit is useful for the formation of the entire product, as the vacuum pressure is transferred from the base mold screen to the mold screens, and through the mold screens to the product surface of the cavity.

In one embodiment, the mold screens of the present invention are porous to allow the application of negative pressure to the mold cavity formed by the joined mold screens within the connected mold blocks of the mold device. In one embodiment, the mold cavity is formed by the connection of the mold blocks together with the base block. In one embodiment, the mold blocks form a complete mold cavity without requiring the use of a base block (i.e., two halves of a mold are combined to form a continuous product mold). In one embodiment, both the mold screens and the base mold screen are porous. In one embodiment, the mold screens are porous while the base mold screen is non-porous.

In one embodiment of the present invention, the mold screens (i.e., the mold screens and the base mold screen) are fastened to a respective housing unit using a fastener. In one embodiment, the fastener includes a cover such as the fastener rim 130 depicted in FIGS. 1-5. The term "fastener rim" as used herein refers to a solid piece of tooling used to connect and/or cover the connection between a peripheral edge of a mold screen to the housing unit. In one embodiment, the fastener rim includes a lip, an edge, a groove, and/or a male and/or female component which is configured to connect to a corresponding lip, edge, groove, and/or male and/or female component of the mold screen. In one embodiment, the fastener rim is configured to connect to a corresponding edge or component of the housing unit. In one embodiment, the fastener rim is configured to connect to a corresponding edge or component of both the housing unit and the mold screen. In this way, vertical movement of the mold screen during formation, drying, pressing, and coating is prevented. In one embodiment, the fastener rim includes one or more bore holes allowing for the insertion of one or more fasteners to secure the fastener rim to the housing unit and/or the mold screen. Examples of insertable fasteners include but are not limited to a screw, a bolt, a rivet, a rod, a coupling nut, a hex nut, a wing nut, a locknut, an acorn nut, a nail, and any combination thereof. The fastener rim or other cover is operable to be either porous or non-porous, allowing for the covering to be incorporated into the mold such that the connection between the mold screen and the housing unit is secured without causing the deformation of the molded article. In one embodiment of the present invention, the mold screens are fastened to a housing unit using a coupling system integrated into the structure of the mold screen and/or the housing unit. In one embodiment, the mold screen includes a lip, an edge, and/or a male and/or female component which is configured to connect to a corresponding edge and/or male and/or female component of the housing unit. In one embodiment, the mold screen includes one or more bore holes allowing for the insertion of one or more fasteners to secure the mold screen to the housing unit.

The housing units of the present invention are solid housing components. In one embodiment, the solid housing components of the mold device are configured to be coupled to one or more vacuum systems. In one embodiment of the present invention, the base housing unit is configured to be coupled to a vacuum system. In one embodiment, the housing units comprise one or more vacuum channels which connect one or more housing units. These vacuum channels are used to conduct negative pressure between the housing units. In this way, negative pressure applied to the one housing unit (i.e., a base housing unit) is transferred to the housing units to which it is connected via the vacuum channels. In one embodiment, individual housing units are configured with an individual vacuum system which applies negative pressure to the mold cavity via the mold screen which is fastened to the housing unit. One of ordinary skill in the art will appreciate that the number of vacuum systems incorporated into embodiments of the present invention wherein each mold and/or base block includes an individual vacuum system is therefore dependent on the number of mold blocks and base blocks used to create the product. For example, a mold device which comprises three mold blocks and a base block would incorporate four individual vacuum systems.

In one embodiment of the present invention, the mold device is submerged (i.e., fully submerged or partially submerged) in a pulp slurry comprising natural fiber suspended in an aqueous solution. In one embodiment, the pulp slurry is applied to the mold cavity. After the pulp slurry contacts the product surface of the mold, either via application or submersion of the mold device, vacuum pressure is applied to the mold cavity through the base mold screen and the mold screens. As negative pressure is applied to the mold cavity, the fibers of the pulp slurry are suctioned to the product surface of the base mold screen and the mold screens, while the aqueous solution is vacuumed through the porous screens and into the housing unit. In one embodiment, when this formation step is complete, the mold blocks are separated to allow for the removal of the molded article from the mold device.

The application of negative pressure to the mold of the present invention causes the aggregation of material onto a product surface of a mold screen when the mold device is submerged in a pulp fiber slurry as disclosed herein. The use of dissimilar pressure for each mold block or dissimilar duration of pressurization results in varying wall thickness between regions of the resulting three-dimensional molded product. In one embodiment, each vacuum system is configured to apply an identical force of negative pressure to the mold screen which is fastened to the housing unit into which the vacuum system is incorporated for an identical duration of time to form a product with uniform integrity. In one embodiment, the mold screens secured to a first housing unit are not identical to the mold screens secured to a second housing unit. In one embodiment, the mold screens secured to a first housing unit are not symmetrical (i.e., a mirror image) to the mold screens secured to a second housing unit. In one embodiment, the housing units with non-identical or asymmetrical mold screens are configured to apply a dissimilar force of negative pressure to the mold cavity via the non-identical or asymmetrical mold screens to form a product with uniform integrity. In one embodiment, the housing units with non-identical or asymmetrical mold screens are configured to apply a uniform force of negative pressure for dissimilar amounts of time to form a product with uniform integrity. One of ordinary skill in the art will appreciate that a dissimilar force of negative pressure applied to the mold cavity for a dissimilar duration of time is operable to form an article with uniform integrity, regardless of the use of non-identical or asymmetrical mold screens. Similarly, the application of an identical force of negative pressure for uniform amounts of time results in the formation of an article with uniform integrity, regardless of the use of non-identical or asymmetrical mold screens. In one embodiment, multiple housing units are operable to implement the same vacuum system such that when the blocks are sealed together, a single vacuum system is used to vacuum form the product. In one embodiment, one or more regions of the mold screens of the present invention are connected to individual vacuum flow channels for directive vacuum pressure to the product surface of the mold screen. The one or more vacuum systems of the present invention is then configured to vary the suction time of various regions (e.g., continuous suction for a first region and 30 second intervals for a second region) to obtain different wall thicknesses on different surface areas.

The mold device of the present invention is configured for simultaneous production of multiple 3D articles. Each cavity formed by connecting the mold blocks and/or connecting the mold blocks and connecting the connected mold blocks with the base block forms a complete mold for an article. While FIGS. 1-5 depict a device with three cavities, resulting in the formation of three articles, the present invention is operable to be configured with more or less cavities than depicted. In one embodiment, the mold device of the present invention includes a single mold cavity (i.e., each mold block of the mold device includes only one mold screen). In one embodiment, the mold device of the present invention includes at least one mold cavity. In one embodiment, the mold device of the present invention includes three or more mold cavities. In one embodiment, the mold device of the present invention includes five or more mold cavities. In one embodiment, the mold device of the present invention includes eight or more mold cavities. In one embodiment, the mold device of the present invention includes ten or more mold cavities.

In one embodiment, the housing units are connected to a hydraulic piston system. In one embodiment, the housing units are connected to a hydraulic piston system. The hydraulic piston system enables the mechanical and/or automated connection and separation of the mold blocks. As the mold blocks are joined, the mold cavity is formed as disclosed herein. As the mold blocks are separated after the molding process, the mold cavity is opened to reveal the molded article. In one embodiment, a frame is used to secure the mold blocks and the base block together during the molding process. The blocks are therefore inseparable until the frame is removed. In one embodiment, the frame is configured with a vacuum system, such that the frame connects to the base block and/or the mold blocks via one or more vacuum channels. In this way, the frame is configured to deliver negative pressure to the mold block and/or base blocks of the mold device of the present invention.

In one embodiment, the article is dried while in the mold device before the mold blocks are separated, as disclosed herein. To form the three-dimensional article of the present invention, the mold blocks are joined to form the mold cavity. In one embodiment, when the formation step is complete, the mold blocks are separated to allow for the removal of the molded article from the mold device. In one embodiment, the article is dried while in the mold device, allowing for the formation of increasingly stable three-dimensional articles and the formation of articles with thin walls. Traditional methods of molding do not enable the drying of a molded pulp product within the mold, requiring a molded pulp product to have a certain thickness to provide sufficient strength to enable the removal of the molded pulp product without deforming the fragile, wet product. However, the drying of the product within the mold eliminates the need for a minimum thickness of the product to withstand handling, as the product is not handled until it is fully dried.

Pressing

In one embodiment, after the formation and drying of the molded fiber product, the product is transferred to a pressing device for further processing. In one embodiment, the system of the present invention uses a pressing device for the pressing and dewatering of three-dimensional molded pulp fiber products. In one embodiment, the pressing device of the present invention is identical to the mold device in both size and shape, such that a machine arm configured to manipulate the mold device is sufficient for the manipulation of the pressing device. The pressing device as described herein incorporates a pressing screen into a solid housing unit in order to press the products of the present invention. The pressing screen comprises a plurality of dewatering channels or large pores through which moisture is removed during the application of positive pressure (i.e., with no vacuum pressure) via an inflatable pressing member as disclosed herein. The use of a pressing device allows for the dewatering and processing of pulp fiber products.

The pressing blocks and base pressing block of the present invention include pressing screens and base pressing screens as disclosed herein. As used herein, the term "base pressing screen" refers to a pressing screen that is affixed to the base housing unit of the present invention. Thus, the disclosure herein relating to pressing screens is applicable to the base pressing screen unless explicitly excluded. Further, the disclosure herein relating to the interaction between pressing screens and the housing unit to which they are affixed is applicable to the base pressing screens and the base housing unit to which they are affixed unless explicitly excluded.

In one embodiment, the pressing screens of the pressing device are porous to allow the dewatering of a product via the application of positive pressure to the cavity of the device as disclosed herein. In one embodiment, both the pressing screens and the base pressing screen of the pressing device are porous. In one the porosity of the pressing screens and the base pressing screen of the pressing device is not identical to the porosity of the mold screens and base mold screen of the mold device. In one embodiment, the pressing screens and the base pressing screen of the pressing device are not porous, but rather contain a plurality of dewatering channels. One of ordinary skill in the art will appreciate that the term dewatering channels refers to openings on the product surface of the pressing screen and base pressing screen which are of a sufficient diameter to allow water to be conducted through the pressing screens without the use of negative pressure.

In one embodiment, the cavity of the pressing device is formed by the connection of the pressing screens together with the base pressing screen as each of the housing units and the base housing unit are combined. In one embodiment, the pressing screens form a complete cavity without requiring the use of a base pressing screen or base component (i.e., two halves of a pressing device are combined to form a continuous product cavity). In one embodiment of the present invention, the pressing screens (i.e., the pressing screens and the base pressing screen) are fastened to a respective housing unit using a fastener as disclosed herein. In this way, vertical movement of the mold screen during pressing is prevented.

In one embodiment, the housing units are connected to a hydraulic piston system. In one embodiment, the housing units are connected to a hydraulic piston system. The hydraulic piston system enables the mechanical and/or automated connection and separation of the mold blocks. As the mold blocks are joined, the mold cavity is formed as disclosed herein. As the mold blocks are separated after the molding process, the mold cavity is opened to reveal the molded article. In one embodiment, a frame is used to secure the mold blocks and the base block together during the molding process. The blocks are therefore inseparable until the frame is removed. In one embodiment, the frame is configured with a vacuum system, such that the frame connects to the base block and/or the mold blocks via one or more vacuum channels. In this way, the frame is configured to deliver negative pressure to the mold block and/or base blocks of the mold device of the present invention.

In one embodiment, the invention includes an inflatable pressing member that is inserted into the opening of the cavity to press and dewater the article within the cavity. In one embodiment, the inflatable pressing member is inflated with fluid. As the inflatable pressing member expands, the fiber of the pulp slurry is pressed against the pressing screen. The expansion of the pressing member pressing results in excess water being pressed from the molded article while in the pressing device. Examples of fluid operable to be fed into the inflatable pressing member include but are not limited to compressed air, oil, and water. In one embodiment, the inflatable pressing member applies a force of pressure that is about 10 atm to about 50 atm. In one embodiment, the inflatable pressing member applies a force of pressure that is about 1 atm to about 10 atm. In one embodiment, the inflatable pressing member applies a force of pressure that is about 1 atm to about 50 atm. In one embodiment, the fluid is heated to shorten the drying time of the molded fiber article while being pressed.

In one embodiment, the inflatable pressing member comprises a flexible material including but not limited to urethane, fluorine rubber, silicone rubber, and elastomeric compositions. One of ordinary skill in the art will appreciate that any material of high tensile strength, impact resilience, and elasticity known in the art is usable for the inflatable pressing member of the present invention. In one embodiment, the inflatable pressing member is not elastic. In one embodiment, the inflatable pressing member is inserted into the cavity to press the fiber to the pressing screens. In one embodiment, the pressing member is made of materials including, but not limited to, a polyethylene film, polypropylene film, a synthetic resin film having aluminum or silica deposited, a synthetic resin film laminated with aluminum foil, paper, or fabrics. In one embodiment, the surface area of the pressing member is equal to or greater than that of the interior of the molded article. In one embodiment, the pressing member is not removed from the interior of the article. Rather, the pressing member is left inside for use as a liner for the article. This advantageously removes the need for a coating process, as the pressing member replaces the coating process.

The pressing device of the present invention is configured for simultaneous pressing of multiple 3D articles. Each cavity formed by connecting the press blocks forms a complete cavity for an article. In one embodiment, the pressing device of the present invention includes a single cavity (i.e., each press block of the pressing device includes only one pressing screen). In one embodiment, the pressing device of the present invention includes at least one cavity. In one embodiment, the pressing device of the present invention includes three or more cavities. In one embodiment, the pressing device of the present invention includes five or more cavities. In one embodiment, the pressing device of the present invention includes eight or more cavities. In one embodiment, the pressing device of the present invention includes ten or more cavities.

Coating

In one embodiment, after the formation and drying and optional pressing of the molded fiber product, the product is transferred to a coating device for further processing. In one embodiment, the system of the present invention uses a coating device to apply a coating layer to three-dimensional molded pulp fiber products. In one embodiment, the coating device of the present invention is identical to the mold device and/or the pressing device in both size and shape, such that a machine arm configured to manipulate the mold device and/or the pressing device is sufficient for the manipulation of the coating device. The coating device as described herein incorporates a coating screen into a solid housing unit in order to coat the products of the present invention. The coating screen, in one embodiment, is non-porous (i.e., occlusive). In one embodiment, the coating screen comprises a plurality of channels or large pores through which air flow is directed to the product surface of the screen. The use of a coating device allows for the application of an even coating layer to pulp fiber products. The coated pulp fiber products are thereby operable to include increased water resistant, waterproof, and strengthening properties enabled by the coating material.

The coating blocks and the base coating block of the present invention include coating screens and base coating screens as disclosed herein. As used herein, the term "base coating screen" refers to a coating screen that is affixed to the base housing unit of the present invention. Thus, the disclosure herein relating to coating screens is applicable to the base coating screen unless explicitly excluded. Further, the disclosure herein relating to the interaction between coating screens and the housing unit to which they are affixed is applicable to the base coating screens and the base housing unit to which they are affixed unless explicitly excluded.

In one embodiment, the coating screens of the coating device are porous to allow airflow to be directed to the product surface of the coating screen. In one embodiment, both the coating screens and the base coating screen of the coating device are porous. In one the porosity of the coating screens and the base coating screen of the coating device is not identical to the porosity of the mold screens or the pressing screens of the present invention. In one embodiment, the coating screens and the base coating screen of the coating device are not porous, but rather contain a plurality of air flow channels.

In one embodiment, the cavity of the coating device is formed by the connection of the coating screens together with the base coating screen as each of the housing units and the base housing unit are combined. In one embodiment, the coating screens form a complete cavity without requiring the use of a base coating screen or base component (i.e., two halves of a coating device are combined to form a continuous product cavity). In one embodiment of the present invention, the coating screens (i.e., the coating screens and the base coating screen) are fastened to a respective housing unit using a fastener as disclosed herein. In this way, vertical movement of the mold screen during coating is prevented.

The coating device is configured to be rotated about an axis of rotation to apply a centrifugal force to a product placed in a cavity of the coating device. One of ordinary skill in the art will appreciate that mechanical rotation about an axis is achievable through a variety of mechanisms, including but not limited to robotic appendages, affixed centrifuge devices, and other machinery including a combination of joints, pins, couplings, and motors. In one embodiment, the coating device of the present invention is removably affixed to a centrifugal device for the application of rotational force to the coating device. In one embodiment, the coating device of the present invention includes individual cavities evenly distributed around an axis of rotation for the coating device. The coating device is arranged at a radial distance from the axis of rotation so that an appropriate centrifugal force acts on the product in the cavity or cavities of the coating device when the rotational movement of the coating device is actuated.

The product of the present invention is placed in the cavity of the coating device. The screens of the coating device are configured to conform to the shape of the product such that when placed in the cavity, the product is flush or significantly flush with the coating screens. The coating screens protect the shape of the products so that there is no risk of product deformation during the centrifuging process. In one embodiment, the coating screens are detachably attached to the centrifuging device by means of the holding device. In one embodiment, the coating screens are joined together such that they are movable as a single coating screen unit. In one embodiment, the coating device comprises at least one movable locking element configured to engage a fixing portion of the joined coating screen unit. In one embodiment, the movable locking element is a retractable projection that engages a corresponding recess in the coating screen unit. In one embodiment, the movable locking element is moved electrically or pneumatically so that a first coating screen unit is operable to be quickly released from the coating device and replaced by a second coating screen unit. In order to release the product from the coating screens after coating, compressed air is guided through the air channels in the coating screens and directed to the product surface of the coating screens. The force of the compressed air detaches the product from the coating screen unit.

In one embodiment, the coating used to coat the product of the present invention comprises at least one ingredient selected from the group consisting of linseed oil, grapeseed oil, soybean oil, cocoa butter, palm oil, rice bran oil, cottonseed oil, beeswax, lanolin, Chinese wax, shellac wax, carnauba wax, sugarcane wax, bayberry wax, candelilla wax, castor wax, esparto wax, Japan wax, Jojoba oil, ouricury wax, rice bran, soy wax, Tallow tree, ceresin waxes, Montan wax, peat wax, paraffin wax, chitosan, starch (e.g., corn starch), and cellulose. In one embodiment, the coating is applied to the product via either partial or complete submersion of the product into a coating. In one embodiment, the coating is applied to the product via pouring coating into a concave section of the product. For this purpose, in one embodiment dispensers for the coating are arranged in the region above the cavity. The dispensers include a reservoir of coating, which is dispensed from the dispenser into the cavity of the coating device, where the product has been placed. Excess coating is poured out of the concave section of the product by flipping the product carrier upside down. In one embodiment, only the interior of the product is coated. In one embodiment, both the interior and the exterior of the product are coated.

The coating device of the present invention is configured for simultaneous coating of multiple 3D articles. Each cavity formed by connecting the coating blocks forms a complete cavity for an article. In one embodiment, the pressing device of the present invention includes a single cavity (i.e., each coating block of the coating device includes only one coating screen). In one embodiment, the coating device of the present invention includes at least one cavity. In one embodiment, the coating device of the present invention includes three or more cavities. In one embodiment, the coating device of the present invention includes five or more cavities. In one embodiment, the coating device of the present invention includes eight or more cavities. In one embodiment, the coating device of the present invention includes ten or more cavities.

General Processing

In one embodiment, the system of the present invention is configured for mass production of molded fiber products. The molded fiber products are formed in a mold device and dried in the mold device before being transferred to a pressing device. In the pressing device, the molded fiber product is then pressed to produce a smooth product surface and apply any surface details or elements to the surface of the product. The product is then transferred to the coating device for application of one or more coating layers to the product. In one embodiment, this process is accomplished manually, via user-actuated movement of the devices of the present invention. In one embodiment, the process of the present invention is partially or fully automated.

Figure 6:
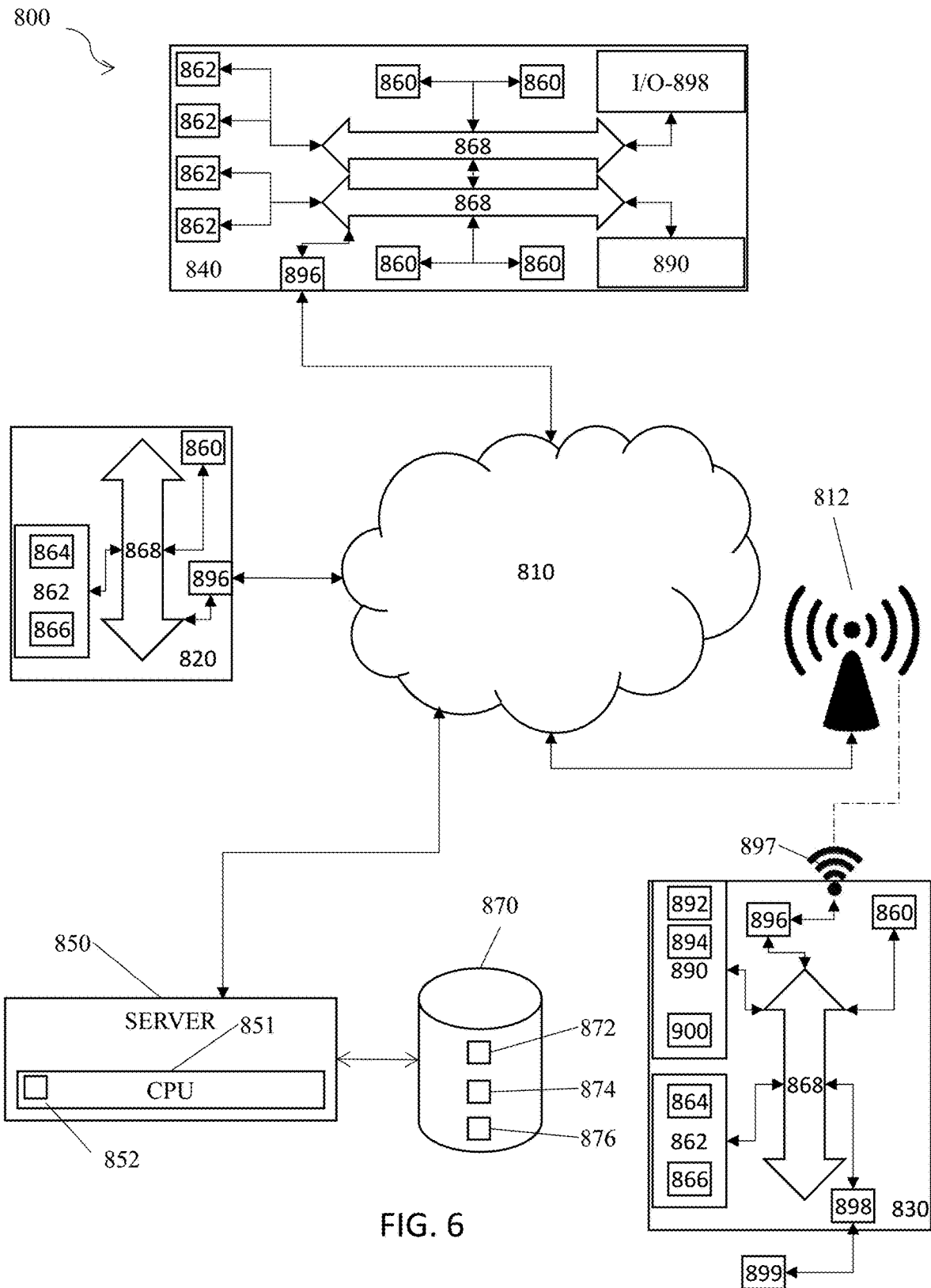
FIG. 6 is a schematic diagram of a system of the present invention.

FIG. 6 is a schematic diagram of an embodiment of the invention illustrating a computer system, generally described as 800, having a network 810, a plurality of computing devices 820, 830, 840, a server 850, and a database 870. The computer system is operable to enable the automated control of the system of the present invention, including the mold device, the pressing device, and the coating device. In one embodiment, the mold device, pressing device, and coating device of the present invention include a processor, a system memory having a random access memory (RAM) and a read-only memory (ROM), and a system bus that couples the memory to the processor. The mold device, pressing device, and coating device are further operable to include a storage device for storing the operating system and one or more application programs, a network interface unit, and/or an input/output controller. In one embodiment, the mold device, pressing device, and coating device are in wireless network communication with one or more computing devices and receive at least one set of instructions via the wireless remote connection.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The claims are amended as follows:

1. A system for forming pulp products from a natural fiber pulp slurry, comprising:
   a first mold block comprising a first mold screen fastened to a first vacuum block, wherein the first vacuum block is configured to receive a first fastener rim, wherein the first fastener rim secures the first mold screen to the first vacuum block;

a second mold block comprising a second mold screen fastened to a second vacuum block, wherein the second vacuum block is configured to receive a second fastener rim, wherein the second fastener rim secures the second mold screen to the second vacuum block; and a base block comprising a base mold screen fastened to a base vacuum block;

wherein the first mold block is operable to interlock with the second mold block and the base block such that in a first position, the first mold screen, the second mold screen, and the base mold screen form a cavity;

wherein the base vacuum block, the first vacuum block, or the second vacuum block, is connected to a vacuum system; and wherein the natural fiber pulp slurry comprises natural fibers, wherein the natural fiber pulp slurry is introduced into the cavity, wherein the natural fibers of the natural fiber pulp slurry aggregates on a porous surface of the first mold screen, the second mold screen, and the base mold screen.

2. The system of claim 1, wherein the first mold block is connected to the second mold block and the base block such that in a second position, the first mold screen separates from the second mold screen.

3. The system of claim 1, wherein a frame is configured to enclose the first mold block, the second mold block, and the base block in the first position, such that a movement of the frame actuates a movement of the first mold block, the second mold block, and the base block.

4. The system of claim 3, wherein the frame is connected to the vacuum system, wherein the frame is configured to connect the first vacuum block to the vacuum system.

5. The system of claim 1, wherein the first mold screen and the second mold screen comprise a threaded section, wherein a product formed using the first mold screen and the second mold screen comprises a threaded neck.

6. The system of claim 1, wherein the first vacuum block comprises a first receiving port configured to receive the first mold screen, wherein the second vacuum block comprises a second receiving port configured to receive the second mold screen.

7. The system of claim 1, wherein the vacuum system is configured to apply negative pressure to the cavity via the first mold screen and the second mold screen.

8. A system for forming pulp products from a natural fiber pulp slurry, comprising:
a first mold block comprising a first mold screen connected to a first vacuum block, wherein the first vacuum block is configured to receive a first fastener rim, wherein the first fastener rim secures the first mold screen to the first vacuum block;

a second mold block comprising a second mold screen connected to a second vacuum block, wherein the second vacuum block is configured to receive a second fastener rim, wherein the second fastener rim secures the second mold screen to the second vacuum block; and a base block comprising a base mold screen connected to a base vacuum block;

wherein the first vacuum block and the second vacuum block comprise an occlusive material;

wherein the first vacuum block is configured to receive the first mold screen;

wherein the first mold block is operable to interlock with the second mold block and the base block such that in a first position, the first mold screen, the second mold screen, and the base mold screen form a cavity; and wherein a frame is configured to enclose the first mold block, the second mold block, and the base block in the first position.

9. The system of claim 8, wherein a movement of the frame actuates a movement of the first mold block, the second mold block, and the base block.

10. The system of claim 8, wherein the frame is connected to a vacuum system, wherein the frame is configured to connect the base vacuum block to the vacuum system, wherein the vacuum system is configured to apply negative pressure to the cavity via the base mold screen.

11. The system of claim 8, wherein the natural fibers of the natural fiber pulp slurry are dried within the cavity.

12. The system of claim 8, wherein a first fastener is configured to form a level surface with the first vacuum block when the first mold screen is received by the first vacuum block and the first fastener is fastened, wherein a second fastener is configured to form a level surface with the second vacuum block when the second mold screen is received by the second vacuum block and the second fastener is fastened.

13. A method of producing a molded pulp product, comprising:
fastening a first mold screen to a first vacuum block to form a first mold block, wherein the first vacuum block is configured to receive a first fastener rim, wherein the first fastener rim secures the first mold screen to the first vacuum block;

interlocking the first mold block to a base mold block, wherein the base mold block comprises a base mold screen and a base vacuum block;

interlocking the first mold block and the base mold block to a second mold block, wherein the second mold block comprises a second mold screen and a second vacuum block, wherein the second vacuum block is configured to receive a second fastener rim, wherein the second fastener rim secures the second mold screen to the second vacuum block;

compressing the first mold block against the second mold block, wherein a cavity is formed between the first mold screen, the second mold screen, and the base mold screen; and connecting a vacuum system to the base vacuum block, the first vacuum block, or the second vacuum block, wherein the vacuum system is configured to deliver negative pressure to the cavity.

14. The method of claim 13, further comprising forming the first mold screen, the second mold screen, and/or the base mold screen via an additive manufacturing process prior to fastening the first mold screen to the first vacuum block.

15. The method of claim 13, further comprising enclosing the first mold block, the second mold block, and the base block with a frame in a first position, such that a movement of the frame actuates a movement of the first mold block, the second mold block, and the base block.

16. The method of claim 13, further comprising drying the natural fibers within the cavity, wherein a dry molded pulp product is formed.

17. The method of claim 13, further comprising connecting a first region of the first mold screen with a first vacuum flow channel and connecting a second region of the second mold screen with a second vacuum flow channel, wherein the first region receives a different negative pressure than the second region.

18. The system of claim 1, wherein the first mold block includes at least one protrusion and at least one recession, wherein the base block includes a first protrusion and a second protrusion, wherein the second mold block includes a first recession and a second recession.

19. The system of claim 18, wherein the first mold block is operable to interlock with the base block by the at least one recession of the first mold block receiving the first protrusion of the base block, wherein the first mold block is operable to interlock with the second mold block by the first recession of the second mold block receiving the at least one protrusion of the first mold block, and wherein the second mold block is operable to interlock with the base block by the second recession of the second mold block receiving the second protrusion of the base block.

* * * * *